TAPE PERFORATOR WITH VARIABLE WIDTH TAPE GUIDE ATTACHMENT

Filed Dec. 31, 1964

INVENTOR.
SAMUEL R. FRANKEL
BY Richard O. Church

United States Patent Office 3,275,233
Patented Sept. 27, 1966

3,275,233
TAPE PERFORATOR WITH VARIABLE WIDTH TAPE GUIDE ATTACHMENT

Samuel R. Frankel, 412 N. State St., Shillington, Pa.
Filed Dec. 31, 1964, Ser. No. 422,685
6 Claims. (Cl. 234—1)

This invention relates to high speed tape perforators, and, more particularly, to guide shoe means for variably adapting the punch block of tape perforators to accommodate varying widths of tape.

For a number of years, a five unit permutation code, commonly called the "Baudot code," has been used in perforating tapes under the control of signals received from a keyboard or a telegraphic transmission. By this means, it has been possible to send, receive, and store intelligence on the perforated tape. More recently, with the development of computers and other data handling devices, other codes have become common, including, in addition to the five level code, those having six, seven, and eight levels.

To adapt conventional printing telegraph apparatus for use with all data processing apparatus, it is necessary to provide methods and means for accommodating tape of different widths that are suitable variously for receiving five, six, seven, and eight level codes. More specifically, it has become standard practice to provide tapes in three widths: the five level tape is normally $^{11}\!/_{16}$ inch wide; the six and seven level tapes are $^{7}\!/_{8}$ inch wide; and the eight level tape is one inch wide. Thus, to obtain greater flexibility and utility, the punch block of the tape perforator should be readily adjustable to accommodate the various widths of tape.

It is, of course, essential that the perforations be precisely spaced across the width of the tape to insure that the tapes will be accurately read by the sensing or reading mechanisms. In the past, when different levels of tape were used, separate punching mechanisms were installed on the perforator for each level of tape to insure this accuracy.

An improved means for accommodating the various levels of tape is disclosed in the U.S. patent to Kettnich, 3,024,971, wherein the tape perforator is provided with a punch and die block having two superposed tape guiding slots. Each guide slot is dimensioned for handling a different width of tape that can be perforated by a single set of punches. While this type of mechanism will handle two widths of tape, a third superposed guide slot would have to be provided in the die block to handle a third width of tape. Further, this construction becomes expensive and mechanically awkward as, inter alia, provision must be made to adapt the stroke of the punches to pass through a plurality of die apertures, and difficulty may be encountered in removing the paper residue from the mechanism.

In U.S. Patent 3,035,471 to De Boo, mechanical means are disclosed whereby the guide block can be adjusted to accommodate different levels of tape while utilizing only a single tape guide slot. This device relies upon a complex lever arrangement that adjusts the effective width of the guide slot by moving guide shoes on both sides of the guide slot.

Other variable adjustments for the guide block have been proposed, but all are variously unwieldly, mechanically complex, or time consuming to adjust. Further, these adjustment devices are built into the guide block and are not adapted for use in existing non-adjustable perforators without considerable, if not impractical, mechanical alteration of such existing equipment.

Accordingly, it is an object of this invention to provide simple and effective means variably to adapt high speed tape perforators to accommodate different levels of tape.

A further object of this invention is to simplify the process of adapting tape punchers to handle different levels of tape.

Another object of this invention is to provide inexpensive and mechanically simple apparatus for guiding various levels of tape through the punch blocks of tape perforators.

Yet another object of this invention is to provide simple and effective means whereby existing tape perforators can be readily adapted to accommodate various levels of tape without mechanical modification of the perforator or punch block.

Briefly, these and other objects of this invention are achieved by providing a plurality of guide shoes of different widths that may removably be mounted adjacent the punch block of a tape perforator. Adjustment for the various levels of tape is obtained by selecting the appropriately dimensioned guide shoe and attaching it by means of screws, or other simple fastening means, to the guide plate that supports the tape while being led into the punch block.

A more complete understanding of this invention will be had by reference to the following detailed description when considered in conjunction with the accompanying drawings, wherein.

Figures 1, 2, 3, 4, 4A:
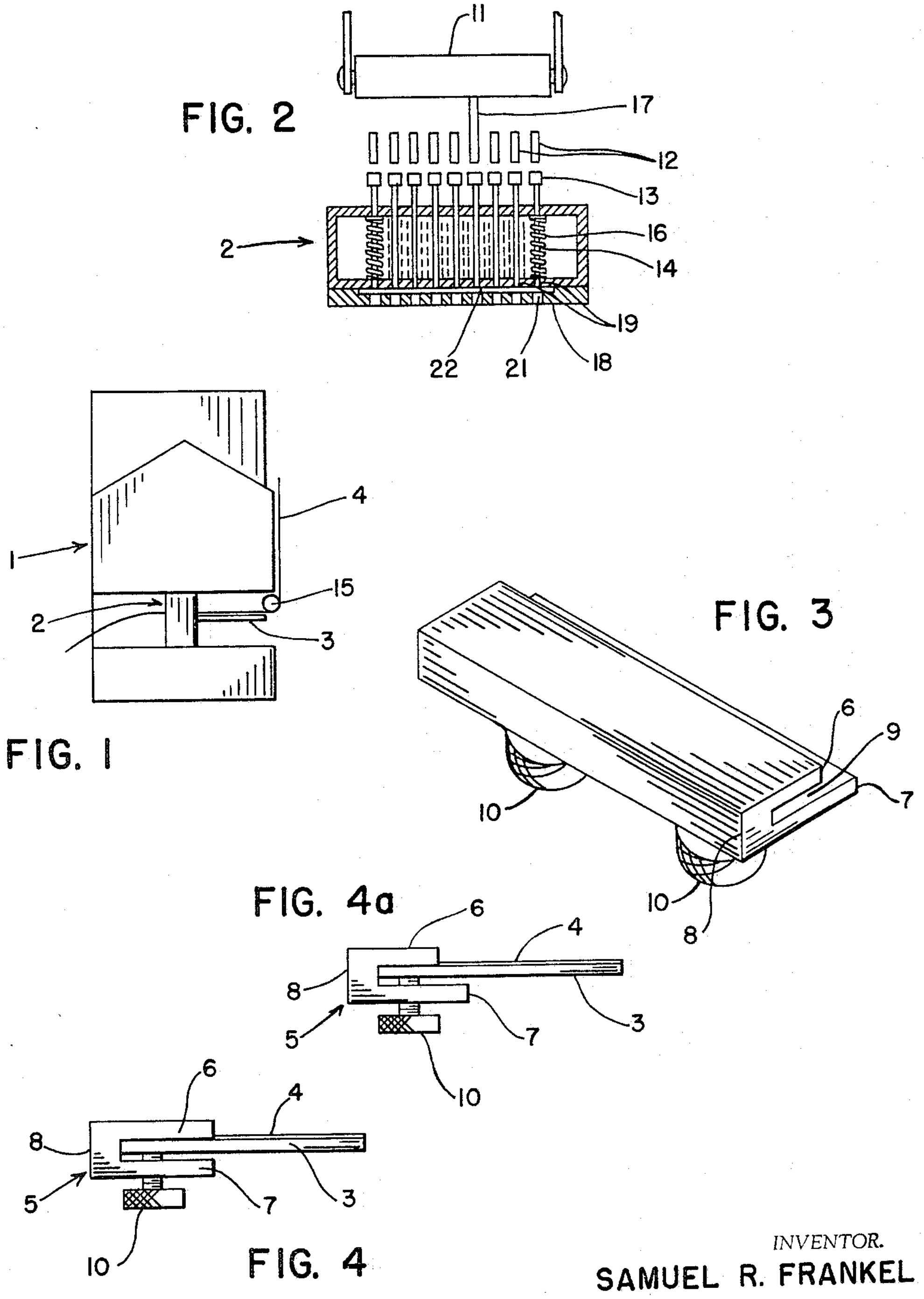
FIG. 1 is a schematic view of a tape punch.
FIG. 2 is a schematic view, in side elevation and partially in section, illustrating the basic elements of the tape punch.
FIG. 3 is a perspective view of the tape guide shoe of this invention.

FIGS. 4 and 4*a* are sectional elevations showing the guide shoes positioned on a tape guide plate while engaged wth the tape.

In FIG. 1, there is schematically illustrated a high speed tape punch 1. A tape 4 is fed from a feed reel (not shown) and is threaded under a roller 15 onto the surface of guide plate 3. The tape 4 is then moved through the punch block 2 where suitable perforations are made in the tape 4. The tape 4 is then wound up on a suitable take-up reel (not shown).

In FIG. 2, the punch block 2 is shown in greater detail. This drawing is highly schematic, and illustrates only the essential mechanisms of the tape punch without going into specific mechanical and structural details.

In operation, the tape perforator is actuated by means of a reciprocating punch hammer 11 which extends above a plurality of punch pins 14 that are selected for actuation by interposer members 12. The punch hammer 11 has associated with it one punch actuator 17 which is operated on each operation of the punch hammer 11 to perforate tape feed holes in the tape. Three interposer members 12 are provided to the right of the punch actuator 17, and five interposer members 12 are provided to the left of the punch actuator 17.

The punch pins 14 are supported in the punch block 2 and are guided in vertical reciprocating motion by the punch block and the punch block apertures 19. The punch block apertures 19 and the punch pins 14 are positioned in registry with die apertures 21 in guide plate 18. A tape guide slot 22 is provided between the guide plate 18 and the lower surface of the punch block 2 in order to accommodate the tape to be punched. The guide slot 22 is of sufficient width to handle all levels of tape.

The punch pins 14 are provided with restoring springs 16 that bias the punch pins to remain in an upper position and out of contact with die plate apertures 21. The reciprocating hammer 11 is provided to actuate punch pins 14 when operatively engaged with the punch pin heads 13 by means of interposer members 12. The interposer members 12 are actuated by any suitable selecter mechanism, and, when selected for actuation, will be moved out into position between the heads 13 of the punch pins 14 and the hammer 11, whereby, when the hammer 11 is moved downwardly in the operation of the perforating apparatus, those punch pins 14 that have been selected for operation by their respective interposer members 12 will be driven downwardly.

As can be seen in FIG. 2, the tape guide slot 22 is defined by the lower surface of the punch block 2 and a channel section milled into the die plate 18. The width of the guide slot 22 is such that it will permit the free passage of an eight level tape while guiding it in sliding relationship by contact with the left and right hand shoulders of the channel section. Accordingly, when a one inch, or eight level tape is so fed through the punch block, all eight of the punches may be utilized to punch code into the tape.

If a narrower tape is used, however, the left hand portion of the tape is moved away from the left shoulder of the channel and abutted in sliding relationship with the right hand shoulder. Thus, when using a ⅞-inch tape, the tape will be led under the seven punches on the right of the punch block and the left punch will not perforate the tape. Similarly, when $^{11}/_{16}$-inch tape is used, only the five right hand punches will be effective to perforate the tape.

In FIGS. 3 and 4, there are shown tape guide shoes made in accordance with this invention and adapted to cause the narrower widths of tape to abut against the right hand shoulder of the die plate 18 as described above. The guide shoe comprises a generally U-shaped structure having an upper leg 6, a lower leg 7, connecting portion 8, and a slotted portion 9. The slot 9 is dimensioned to receive a portion of the guide plate 3 as shown in FIGS. 4 and *4a*. The lower leg 7 of the U is drilled and tapped to receive screw fastening means 10 which, when in their advanced position, engage the under side of guide plate 3 and fixedly position the shoe on the guide plate 3. As can be seen in FIGS. 4 and *4a*, the upper legs 6 of the guide shoe 5 may be of different lengths, and are designed to engage the left hand edge of the tape 4 in guiding relationship. Thus, the tape is guided at its left hand edge by the upper leg 6 of the guide shoe 5, and at its right hand edge by the right hand shoulder of the guide slot of the die plate.

From the above, it will be appreciated that it is extremely simple to adapt the punch block to accept different levels of tape. When an eight level tape is used, neither guide shoe 5 is attached to the guide plate. When a six or seven level tape is used, the guide shoe of FIG. *4a* is attached to the guide plate 3; and when a five level tape is used, the guide shoe of FIG. 4 is utilized. All that is required of the operator is to slide the slot 9 onto the guide plate 3, abut the closed end 8 of the guide shoe with the guide plate and tighten the thumb screws 10. As only a few seconds are required to install or remove these guide shoes, a change in the level of tape can be simply accomplished without special tools, training, or loss of machine time.

I claim:

1. In a high speed tape perforator of the class described having a punch block containing a plurality of punch pins that selectively may be actuated to perforate a tape passing therethrough, the improvement comprising a tape guide shoe removably mounted adjacent said punch block and adapted to engage one margin of said tape in guiding relationship whereby the position of said tape with respect to said punch pins can accurately be controlled.

2. A high speed tape perforator according to claim 1 in which a substantially horizontally positioned guide plate is affixed to the entrance end of said punch block and said guide shoe is removably mounted on said guide plate.

3. A high speed tape perforator according to claim 2 in which said tape guide shoe is an essentially U-shaped structure, the center of said U-shaped structure being adapted to receive said guide plate; the lower leg of said U-shaped structure being adapted to carry fastening means for removably attaching said shoe to said guide plate; and said upper leg being adapted to engage the outboard margin of said tape in sliding and guiding relationship.

4. A high speed tape perforator according to claim 3 in which said upper leg is dimensioned to guide said tape in a manner such that the inboard margin of said tape engages a guide integrally contained within said punch block.

5. A high speed tape perforator according to claim 3 in which said fastening means are comprised of thumb screws.

6. A method of guiding varying widths of tape through a high speed tape perforator comprising positioning a tape guide shoe adjacent the entrance end of the punch block of said tape perforator to engage the outboard edge of the tape passing therethrough and guide the inboard edge of such tape into sliding relationship with a guide integrally contained within said punch block.

No references cited.

WILLIAM S. LAWSON, *Primary Examiner.*